(No Model.)
G. W. KNAPP.
BUCKET HANDLE.
No. 312,208. Patented Feb. 10, 1885.
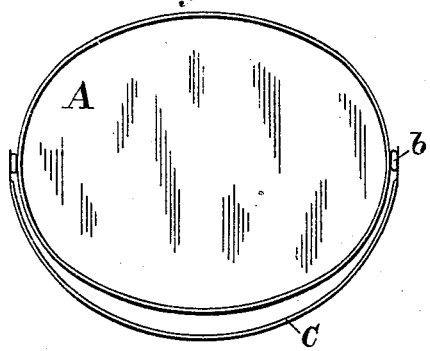
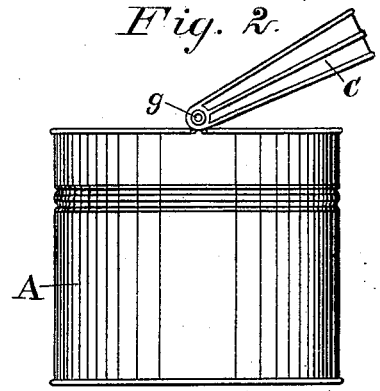
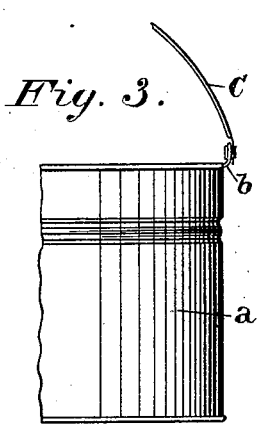
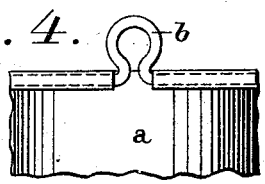
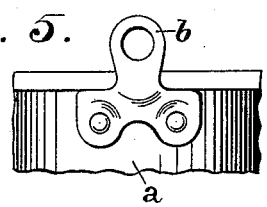
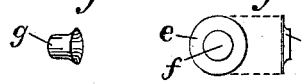
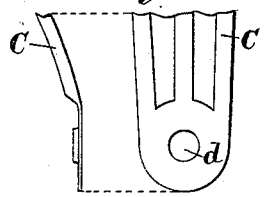
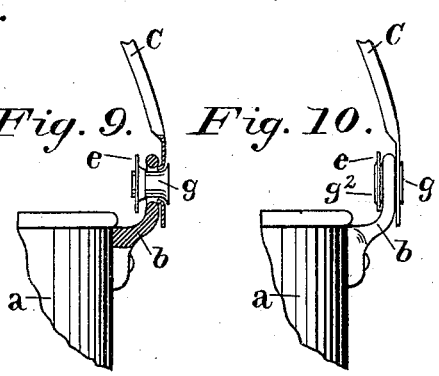
WITNESSES:
Orrin C. Painter.
John E. Morris.
INVENTOR:
Geo. W. Knapp
By Chas B. Mann
Attorney.

UNITED STATES PATENT OFFICE.

GEORGE W. KNAPP, OF BALTIMORE, MARYLAND.

BUCKET-HANDLE.

SPECIFICATION forming part of Letters Patent No. 312,208, dated February 10, 1885.

Application filed October 30, 1884. (No model.)

*To all whom it may concern:*

Be it known that I, GEORGE W. KNAPP, a citizen of the United States, residing at Baltimore, in the State of Maryland, have invented certain new and useful Improvements in Bucket-Handles, of which the following is a specification.

My invention relates to an improvement in attaching bails or handles to buckets and like vessels.

The construction of the parts and manner of applying the same will first be described, and the invention then designated in the claim.

The accompanying drawings illustrate the invention, Figure 1 being a top view of a sheet-metal bucket with the handle attached according to my improvement. Figs. 2 and 3 are side views of same. Figs. 4 and 5 are two views, each showing a portion of the wall of a bucket having fastened thereto a different form of ear, both suited for my improvement. Fig. 6 is a view of the eyelet employed. Fig. 7 is a view of the perforated disk employed. Fig. 8 is a view of one end of the bail. Fig. 9 shows the eyelet through the handle and the disk slipped on the end of the eyelet. Fig. 10 shows the finished article, the end of the eyelet being spread, thereby attaching the handle to the ear.

This invention is designed more particularly for the attachment to ears on vessels of bails and handles made of sheet metal in distinction to those made of wire. In the present instance an oblong-shaped vessel, A, is shown, which style of vessel is commonly known as a "butter-bucket." The wall $a$ of the vessel has an ear, $b$, of any desired construction, and fastened thereto in any desired manner. The bail C is made of sheet metal, and is flat in shape, as bails of this kind usually are. Each end of the bail has a round hole, $d$, whereby it is attached, and a sort of flange or burr is produced on one side of the bail by punching this hole. A disk, $e$, has a central perforation, $f$, and a sort of flange or burr, $f'$, is produced on one side in punching this perforation. The bail is in contact with the outer side of the ear, and the eyelet $g$ is passed through the hole $d$ in the end of the bail and through the ear $b$, and its head or flange $g'$ rests in contact with the outer surface of the bail, as shown in Figs. 2 and 9. The perforated disk $e$ is then slipped on the small end of the eyelet, its side having the flange or burr $f'$ being next to the inner side of the ear. The small end of the eyelet is then spread or flared, as at $g^2$, against the disk, as shown in Fig. 10. Thus the eyelet acts as a tubular rivet to hold the bail to the ear.

This device makes a neat and cheap fastener to attach the bail to the ear, and the cover of the bucket may be fastened on by a string passed through the eyelet at each end of the bail and extended across the top of the cover. Thus placed, the string will not be cut or worn by the bail or ear.

It will be seen that the flange or burr around the hole $d$ in the bail and the flange or burr $f'$ on the disk confront each other and come together in the ear, and are held in this position by the eyelet-rivet. Thus the said flanges or burrs and the eyelet produce a double thickness of metal through the ear.

Having described my invention, I claim and desire to secure by Letters Patent of the United States—

A vessel having ears fastened thereto, a bail or handle having in its end a hole, $d$, with a flange or burr around it entering one side of the ear, a perforated disk having a flange or burr, $f'$, entering the opposite side of the ear, and an eyelet passed through both of said flanges or burrs and ear, as set forth.

In testimony whereof I affix my signature in presence of two witnesses.

GEORGE W. KNAPP.

Witnesses:
 WM. B. NELSON,
 JOHN E. MORRIS.